United States Patent
Bush

(10) Patent No.: US 7,660,301 B2
(45) Date of Patent: Feb. 9, 2010

(54) SYSTEM AND METHOD FOR NETWORK CODING AND/OR MULTICAST

(75) Inventor: Stephen F. Bush, Latham, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 500 days.

(21) Appl. No.: 11/444,363

(22) Filed: Jun. 1, 2006

(65) Prior Publication Data
US 2007/0280233 A1 Dec. 6, 2007

(51) Int. Cl.
*H04L 12/28* (2006.01)
*H04J 3/16* (2006.01)

(52) U.S. Cl. .................. 370/389; 370/390; 370/468

(58) Field of Classification Search ........... 370/390, 370/389, 468
See application file for complete search history.

(56) References Cited

U.S. PATENT DOCUMENTS

| | | | |
|---|---|---|---|
| 7,191,246 B2* | 3/2007 | Deshpande | 709/233 |
| 2004/0090989 A1* | 5/2004 | Kobayashi | 370/469 |
| 2005/0152391 A1* | 7/2005 | Effros et al. | 370/432 |
| 2006/0251062 A1* | 11/2006 | Jain et al. | 370/389 |

OTHER PUBLICATIONS

Byers, J.W.; Luby, M.; Mitzenmacher, M.; "A digital fountain approach to asynchronous reliable multicast" IEEE Journal on Selected Areas in Communications, vol. 20, Issue 8, Oct. 2002 pp. 1528-1540.*

Sagduyu et al "Joint scheduling and wireless network coding" NETCOD 2005, Apr. 6, 2005.*

Johnson, M.; Ishwar, P.; Prabhakaran, V.; Schonberg, D.; Ramchandran, K.; "On compressing encrypted data" IEEE Transactions on Signal Processing, vol. 52, Issue 10, Part 2, Oct. 2004 pp. 2992-3006.*

Ying Zhu; Baochun Li; Jiang Guo; "Multicast with network coding in application-layer overlay networks" IEEE Journal on Selected Areas in Communications, vol. 22, Issue 1, Jan. 2004 pp. 107-120.*

Fasolo, E "Network Coding Techniques" Mar. 2004.*

Bush, S. and Hughes, T., "*The Effectiveness of Estimates of Kolmogorov Complexity to Identify Semantic Types*", http://www.atl.external.lmco.com/overview/papers/1172.pdf, pp. 1-9 (2003).

* cited by examiner

*Primary Examiner*—Dang T Ton
*Assistant Examiner*—Robert M Morlan
(74) *Attorney, Agent, or Firm*—Nixon & Vanderhye P.C.

(57) ABSTRACT

A system and/or method for relaying messages in a network (e.g., a mobile network) are provided. Certain example embodiments allow communications between nodes to be network coded, multicast, and compressed (e.g. compressed within layers and/or among layers). Preferably, rateless forward error correction (FEC) packets, or simulations and/or approximations thereof, are included by network coding. Furthermore, data preferably is transmitted along the max-flow min-cut of the network.

9 Claims, 7 Drawing Sheets

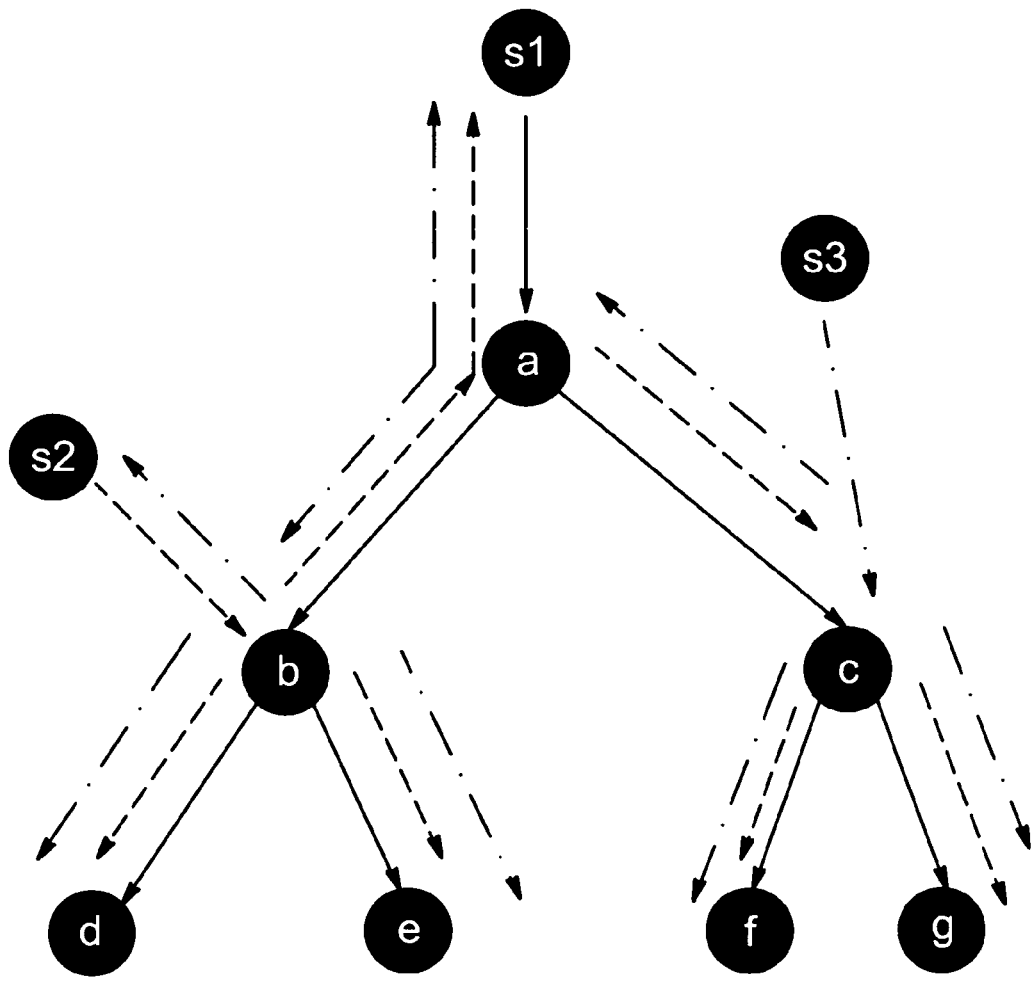
FIG. 2
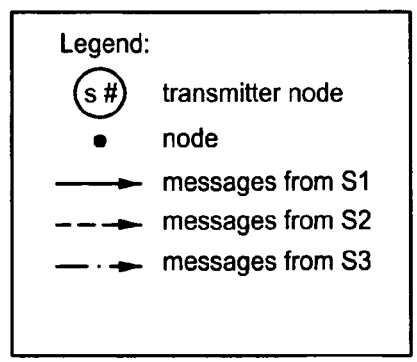

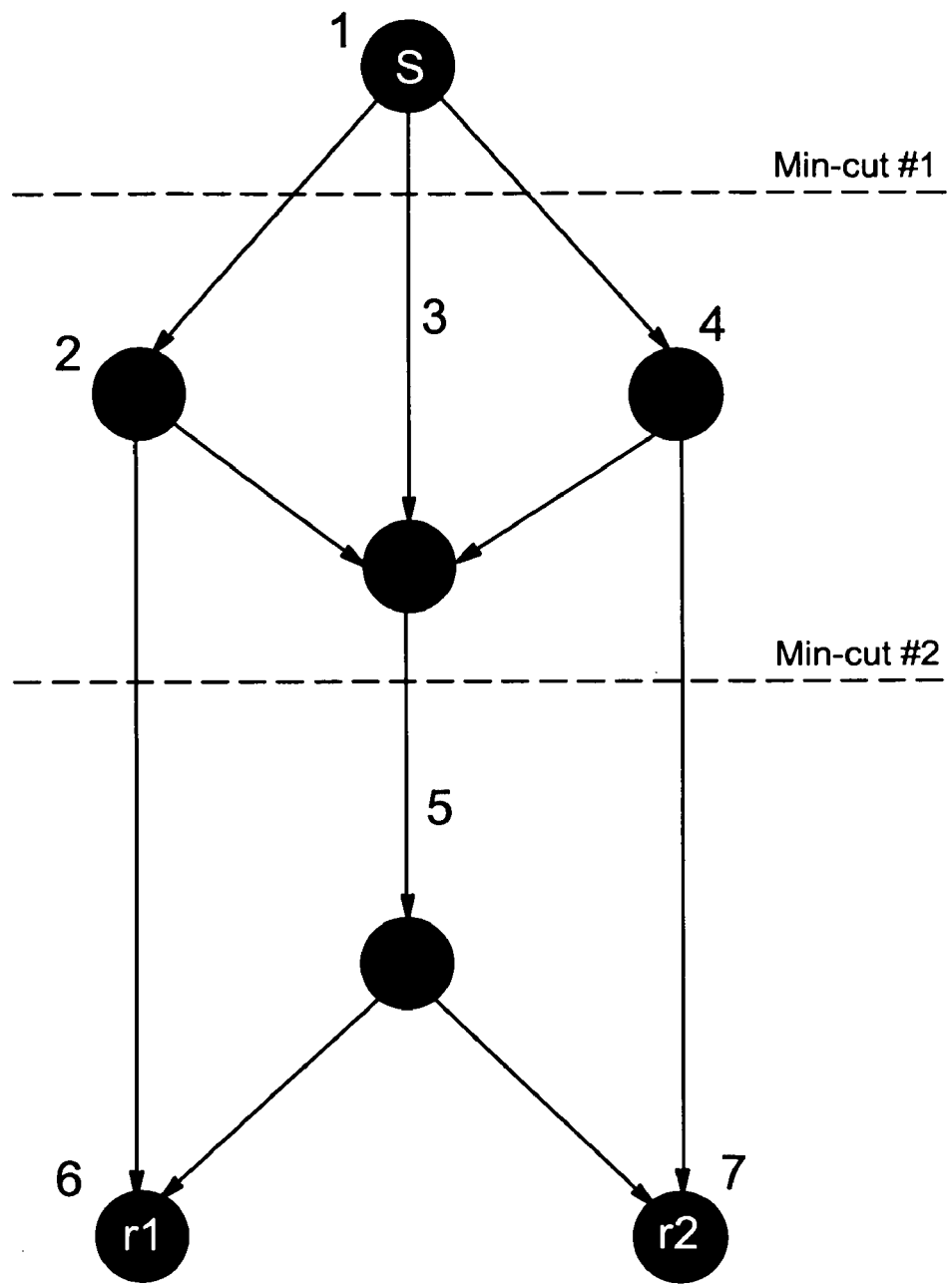
FIG. 3A
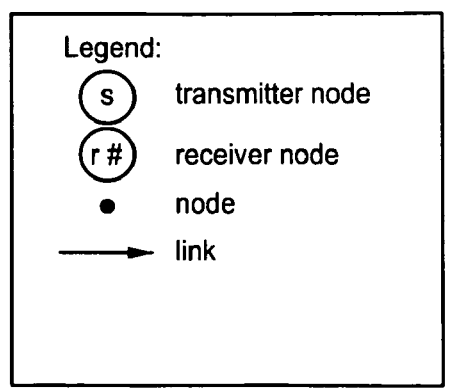

SYSTEM AND METHOD FOR NETWORK CODING AND/OR MULTICAST

FIELD OF THE INVENTION

The present invention relates to a system and/or method for relaying messages between nodes in a network (e.g., nodes in a wireless network). In particular, the present invention relates to communications between nodes, where data to be transmitted is network coded, multicast, and compressed (e.g. compressed within layers or among layers). Preferably, rateless forward error correction (FEC) packets are included by network coding.

BACKGROUND OF THE INVENTION

Data conventionally has been sent though networks via unicast. Unicast sends information packets to a single destination, for example, by sending the same packets individually to each receiver. A problem with unicast relates to potentially redundant transmissions which may, for example, strain the network. This problem is illustrated in FIG. 1A, which is an exemplary diagram of a unicast transmission. FIG. 1A shows nodes 102a-d in network 100. Originating node 102a sends messages 104a-h through a plurality of nodes in the network to appropriate receivers (not shown). For illustrative purposes, messages 104a-h are all the same. Node 102b receives all of messages 104a-h, and relays two messages (104g-h) to their respective receivers. Now, node 102b sends messages 104a-f to node 102c. Node 102c receives messages 104a-f, and relays two messages (104e-f) to their respective receivers. This process continues to node 102d, which receives messages 104a-d and relays the messages accordingly. The entire unicast in this example is wasteful of bandwidth, a precious commodity in networks, because it relays the same message multiple times through many nodes.

One solution to this problem is multicast. Multicast involves the delivery of information to a group of destinations simultaneously using the most efficient strategy to deliver the messages over each link of the network only once, and only creates copies when the links to the destinations split. Thus, multicast nodes are configured to, when appropriate, duplicate messages for each receiver and transmit accordingly. FIG. 1B is an exemplary diagram of a multicast transmission. FIG. 1B shows nodes 106a-d in network 100'. Originating node 106a sends a single message 108 through a plurality of nodes in the network to appropriate receivers (not shown) by duplicating the message when necessary. Thus, node 106b receives message 108, duplicates it, and relays messages 108a-b (which are duplicates of message 108) to their respective receivers. Node 106b also relays message 108 to node 106c, where the process is continued. Thus, multicast potentially represents an improvement of unicast. One example of a multicast standard is the IETF RMT multicast standard, which may operate with a network architecture, for example, Internet Protocol, also as defined by IETF standards. It will be appreciated that there are numerous other multicast standards and network architectures, that this is only one example thereof, and that others may be used alone or in combination with certain embodiments.

However, multicast schemes also suffer drawbacks. For example, because multicast is uniform throughout nodes in a network, networks with receivers of different pipe widths may have trouble receiving data. Specifically, low-capacity receivers may experience blockage and/or data corruption (e.g. bit loss, etc.). An inherent feature in conventional multicast, then, is that the final state space results in either successful or unsuccessful transmissions; that is, typically, there are no partial successes.

Thus, it will be appreciated that there is a need in the art to overcome one or more of these and other disadvantages to, for example, more efficiently and accurately transfer data through a network.

SUMMARY OF THE INVENTION

One aspect of the invention relates to a method of sending a message through a network of nodes, with the method comprising coding the message with forward error correction data; network coding the message; and sending the network coded message with the forward error correction data from a sender through the network of nodes.

Certain example embodiments relate to a method sending a message through a network of nodes, comprising separating the message into plurality of layers for use with forward error correction coding; network coding each layer in the plurality of layers; and sending the plurality of layers from a sender through the network of nodes.

Certain other example embodiments relate to a method of multicasting a message through a network of nodes, comprising separating the multicast message into a plurality of multicast layers; compressing the plurality of multicast layers; and sending the plurality of multicast layers from a sender through the network of nodes.

Still other example embodiments relate to a method of sending a message through a network of nodes comprising network coding the message using encoding vectors to generate network coded packets; compressing the encoding vectors used for the network coding; including the compressed encoding vectors within the network coded packets; and sending the network coded packets from a sender through the network of nodes.

Other example embodiments relate to a method of transmitting a message from at least one sender through a network of nodes comprising for the at least one multicast sender generating a plurality of session layers comprising a primary layer and a coding layer; compressing packets, from the same multicast sessions but different layers, together, into information packets; and transmitting the information packets to another node; and for each node in the network of nodes choosing a random coding vector; receiving information packets from the at least one multicast sender; uncompressing the packets; encoding the packets; compressing the packets; and transmitting the coding vector and the information vector in a single packet; and when the current node is not the receiver, transmitting the packets to another node.

Another aspect of the invention relates to a system for sending a message through a network of nodes comprising at least one sender node that is capable of coding the message with forward error correction data and network coding the message; and at least one receiver node capable of decoding the message; wherein the network coded message with the forward error correction data is sent through the network of nodes from the at least one sender node to the at least one receiver node.

Certain example embodiments relate to a system for sending a message through a network of nodes comprising at least one sender node capable of separating the message into a plurality of layers for use with forward error correction coding, and network coding each layer in the plurality of layers; and at least one receiver node capable of recombining the layers and network decoding the layers; wherein the plurality of layers is sent from a sender to a receiver through the network of nodes.

Certain other example embodiments relate to a system of multicasting a message through a network of nodes comprising at least one sender node capable of separating the multicast message into a plurality of multicast layers and compressing the plurality of multicast layers; and at least one receiver node capable of receiving the multicast message and decompressing the plurality of multicast layers; wherein the plurality of multicast layers are sent from the at least one sender node to the at least one receiver node through the network of nodes.

Still other example embodiments-relate to a system of sending a message through a network of nodes comprising at least one sender node capable of network coding the message using encoding vectors to generate network coded packets and compressing the encoding vectors used for the network coding; and at least one receiver node capable of decoding the network coded packets and compressed encoding vectors; wherein the compressed encoding vectors are included within the network coded packets, and the network coded packets are sent from the at least one sender node to the at least one receiver node through the network of nodes.

Other example embodiments relate to a system of transmitting a message from a multicast sender to a receiver through a network of nodes, wherein the multicast sender generates a plurality of session layers comprising a primary layer and a coding layer; compresses packets, from the same multicast sessions but different layers, together, into information packets; and transmits the information packets to another node; each node in the network of nodes chooses a random coding vector; receives information packets from the multicast senders; uncompresses the packets; encodes the packets; compresses the packets; and transmits the coding vector and the information vector in a single packet; and when the current node is not the receiver, the current node transmits the packets to another node, and when the current node is the receiver, the current node uncompresses and decodes the packets using the encoding vector and the information vector.

Other aspects, features, and advantages of this invention will become apparent from the following detailed description when taken in conjunction with the accompanying drawings, which are apart of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 2 is a core-based tree example of incorporating error correction into a multicast system according to an example embodiment of the instant invention;

FIG. 3A is an example max-flow min-cut graph reflecting a typical network;

DETAILED DESCRIPTION OF ILLUSTRATED EMBODIMENTS

Certain example embodiments adapt multicast by introducing rateless (or approximated or simulated rateless) forward error correction coding through network coding, while compressing data in and/or across layers. It will be appreciated that the adaptations, enhancements, and the like described herein may be used alone, in partial combination, or all together, depending upon the implementation chosen. It also will be appreciated that while the following descriptions identify particular algorithms, protocols, standards, and the like, the invention is not so limited; to the contrary, the descriptions provided are for illustrative, non-limiting purposes only. Other algorithms, protocols, standards, and the like may be used instead of, or in combination with, those provided below.

One solution to the problem of the lack of partial successes involves including error correction data, such as, for example, parity bits, forward error correction (FEC), etc. FIG. 2 is a core-based tree example of incorporating error correction into a multicast system. In FIG. 2, there are three transmitters (e.g. satellites) s1-s3. Transmitter s1 transmits messages according to the solid lines; transmitter s2 transmits messages according to the evenly-dashed lines, and transmitter s3 transmits messages according to the long-and-short dashed lines. As is a feature with multicast systems, data is duplicated only when necessary at branch points a-c before reaching receivers d-g. FEC, for example, is normally added by the transmitter. When redundant FEC is used, the information may flow across the entire network.

Messages need not be transmitted all at once. Indeed, it may not be feasible to transmit certain messages because of, for example, network limitations. Thus, network coding may be used to break messages into blocks. Network coding may also repeat and transmit certain blocks to replace lost or delayed multicast blocks in accordance with the error correction techniques described above.

Figure 1B:
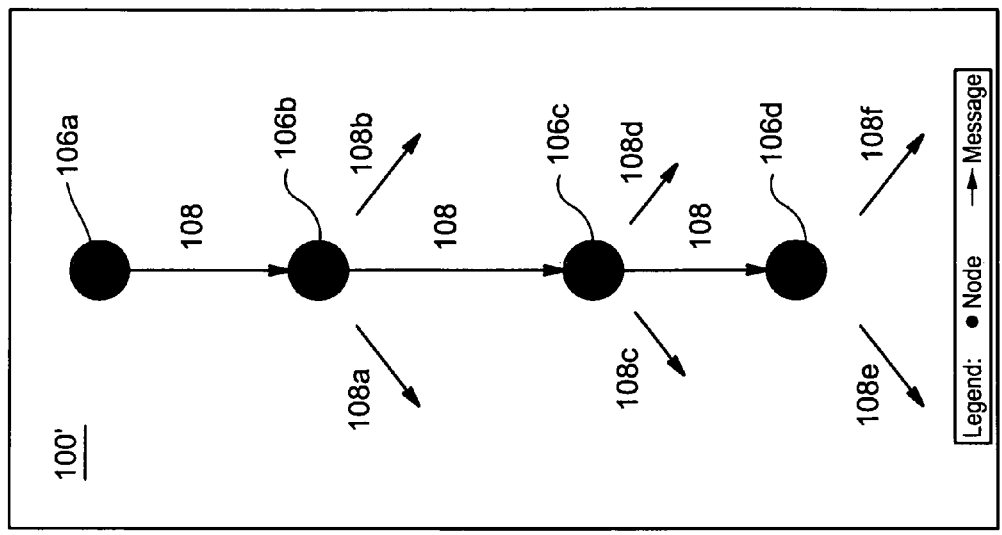
FIG. 1B is an exemplary diagram of a multicast transmission.
Figure 1A:
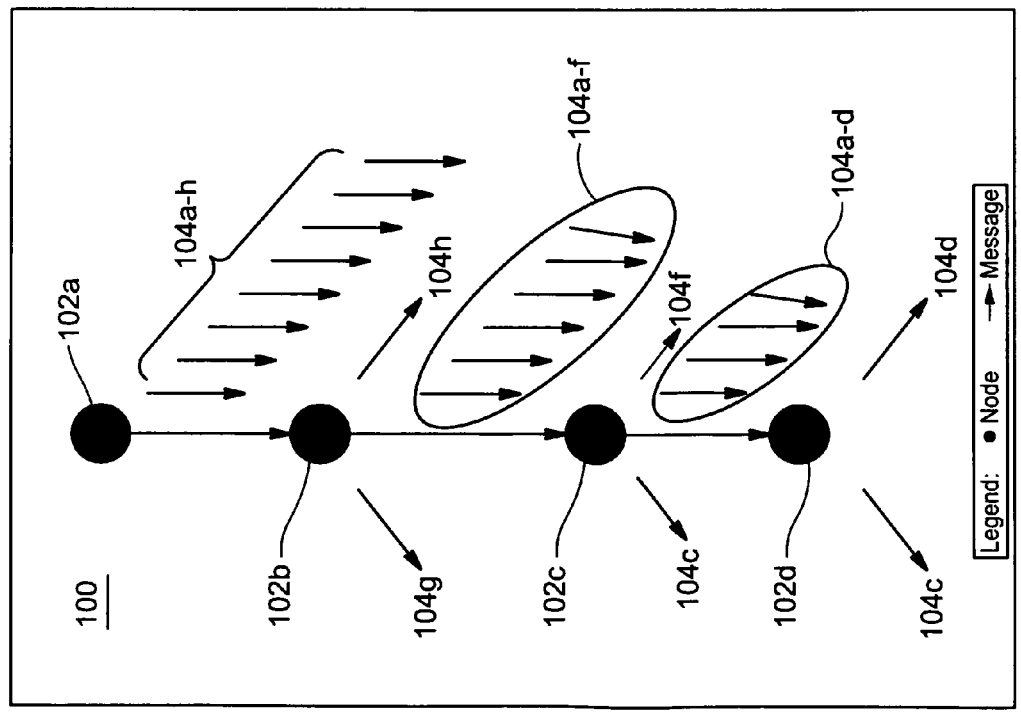
FIG. 1A is an exemplary diagram of a unicast transmission.
Figure 3:
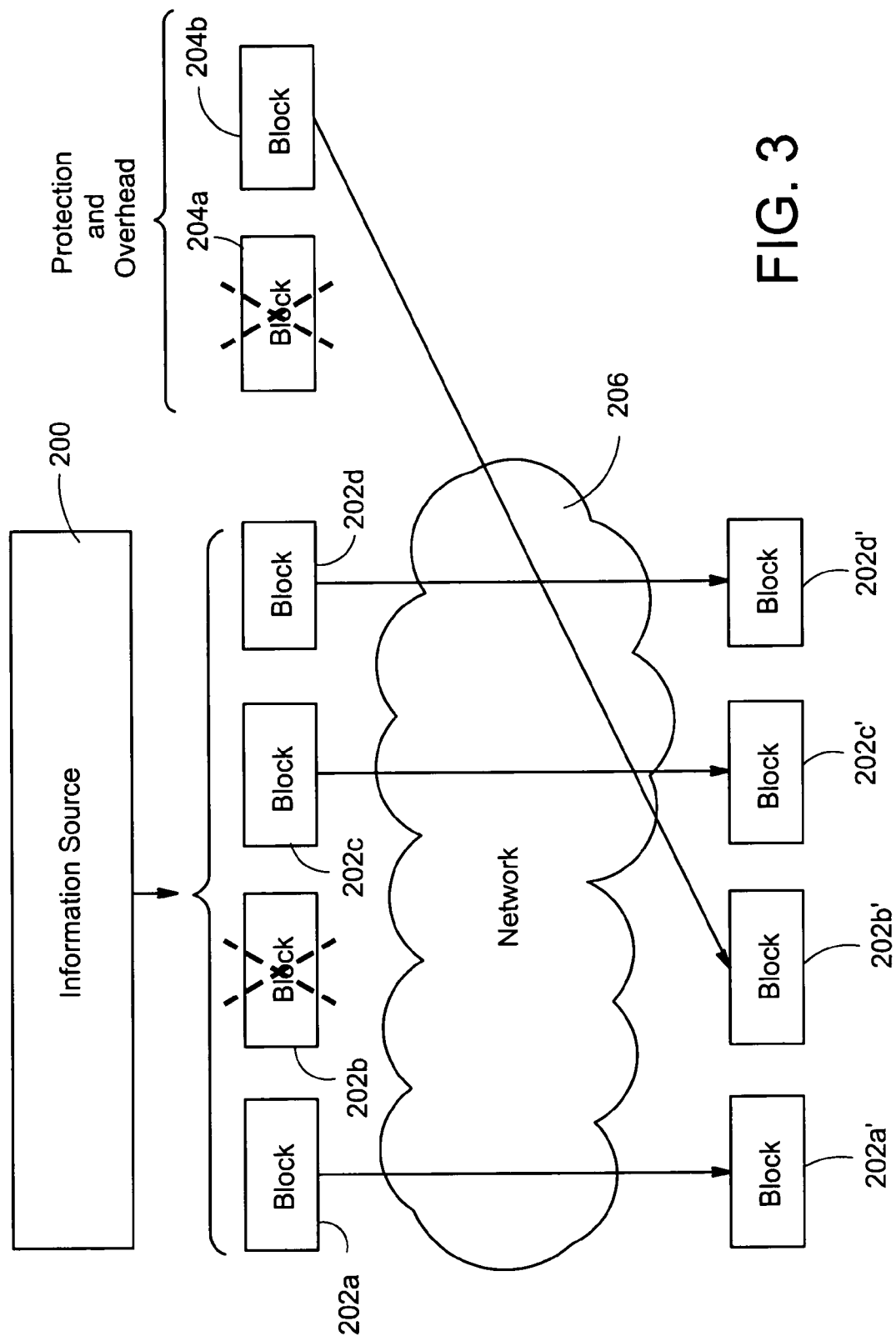
FIG. 3 is an example of how network coding may work with multicast to include error correction.

FIG. 3 is an example of how network coding may work with multicast to include error correction. Information source 200 may break a message down into K blocks of length k. In this example, K=4, corresponding to blocks 202*a-d*. N additional encoding blocks of length l comprising protection and overhead information also may be provided. In this example, N=2, corresponding to encoding blocks 204*a-b*. A stretch factor can be defined as N/K, and each block can be stretched into a block of length k+l. A small k improves the coding speed, but also defeats the purpose of coding because the coding only applies to the immediate packet.

In this hypothetical example, block 202*b* is blocked from transmission through the network because of, for example, network congestion, network failure, limitations of the receivers, etc. However, a receiver still may reconstruct the message from the extra protection and overhead information comprising encoding block 204*b*. Although this process enables messages to be transmitted despite long (or even permanent) blockages, there is a tradeoff between, for example, the space (e.g. overhead, bandwidth, amount of coding, etc.) and time (e.g. time of coding, time of transmission, etc.). Thus, while it may be ideal from a data integrity viewpoint to implement an infinite (or simulated infinite) stretch factor (e.g. rateless FEC), it simply is not feasible using these techniques. Infinite stretch factors may be simulated by, for example, using approximations and/or cycling through the encoding N packets.

1. Overview of Example Components

1.1 Network Coding

Preferably, network coding is performed node-to-node (sometimes referred to as hop-to-hop). This feature enables, for example, distributed error correction coding. Network coding preferably is implemented to allow for the theoretical optimal flow of data through a network. In certain example embodiments, likening a network to a graph, network coding enables transmission through the max-flow min-cut of the network. The maximal amount of a flow is equal to the capacity of a minimal cut.

The max-flow min-cut theorem proves the maximal network flow and the sum of the cut-edge weights of any minimal cut that separates the source (e.g. transmitter) and the sink (e.g. receiver). It will be appreciated that although there are polynomial-time algorithms to solve the min-cut problem, there may be more than one min-cut in a given graph, and that the max-flow is the dual of the min-cut problem. Defining a graph, G, with verticies V, edges E, a source S, and a terminal T, and of capacity C, one pseudo-code algorithm for determining max-flow min-cut in a graph is:

```
1.   f := 0 (flow 0 on all edges)
2.   opt := false
3.   WHILE not opt DO
3a.      construct the residual graph G_f
3b.      find a directed path P from S to T in G_f (an augmenting path)
3c.      IF such an augmenting path P exists
3d.         THEN update flow f along P
3e.         ELSE set opt := true; and X := the set of
             vertices in G_f reachable from S
4.   END-WHILE
5.   return f as the max flow, and (X, V-X) as the min-cut
END
```

FIG. 3A is an example max-flow min-cut graph reflecting a typical network. There are two min-cuts shown in FIG. 3A. The max-flow from sender node s to receivers r1 and r2 is the min-cut in which s is in one cut set and receivers r1 and r2 are in the other cut set. FIG. 3A assumes that that all links are of equal capacity.

In certain example embodiments, the overhead used in network coding may be minimized by, for example, combining packets at each node. In this way, the message is continually coded throughout the network. Preferably, the network coding process functions irrespective of other coding that may be taking place. Thus, for example, the network coding process does not assume that other coding is carried out before, during, or after the transmission.

1.2 Layered Coding

Multicast is uniform in its transmission of data. This feature of multicast, however, may be a problem for different receivers with different pipes widths. Data may therefore sit while a particular receiver processes it, for example, causing problems specific to the receiver involved and/or the relaying node, backing up the entire network, etc. To alleviate this problem, layered coding may be introduced. For example, one solution includes splitting data from the transmitters into pipes of known widths. Receivers may then "subscribe" to sessions (e.g. pipes). Once the sender has information related to the capacity of the receiver, it may then send data. It will be appreciated that such subscription features may be replaced with other mechanisms of communicating the respective capacities (e.g. upload and/or download speeds, etc.) of the sender and/or receiver. One example of a layered coding standard is the IETF RMT Asynchronous Layered Coding standards. It will be appreciated that there are numerous other standards, that this is only one example thereof, and that others may be used alone or in combination with certain embodiments.

Figure 4:
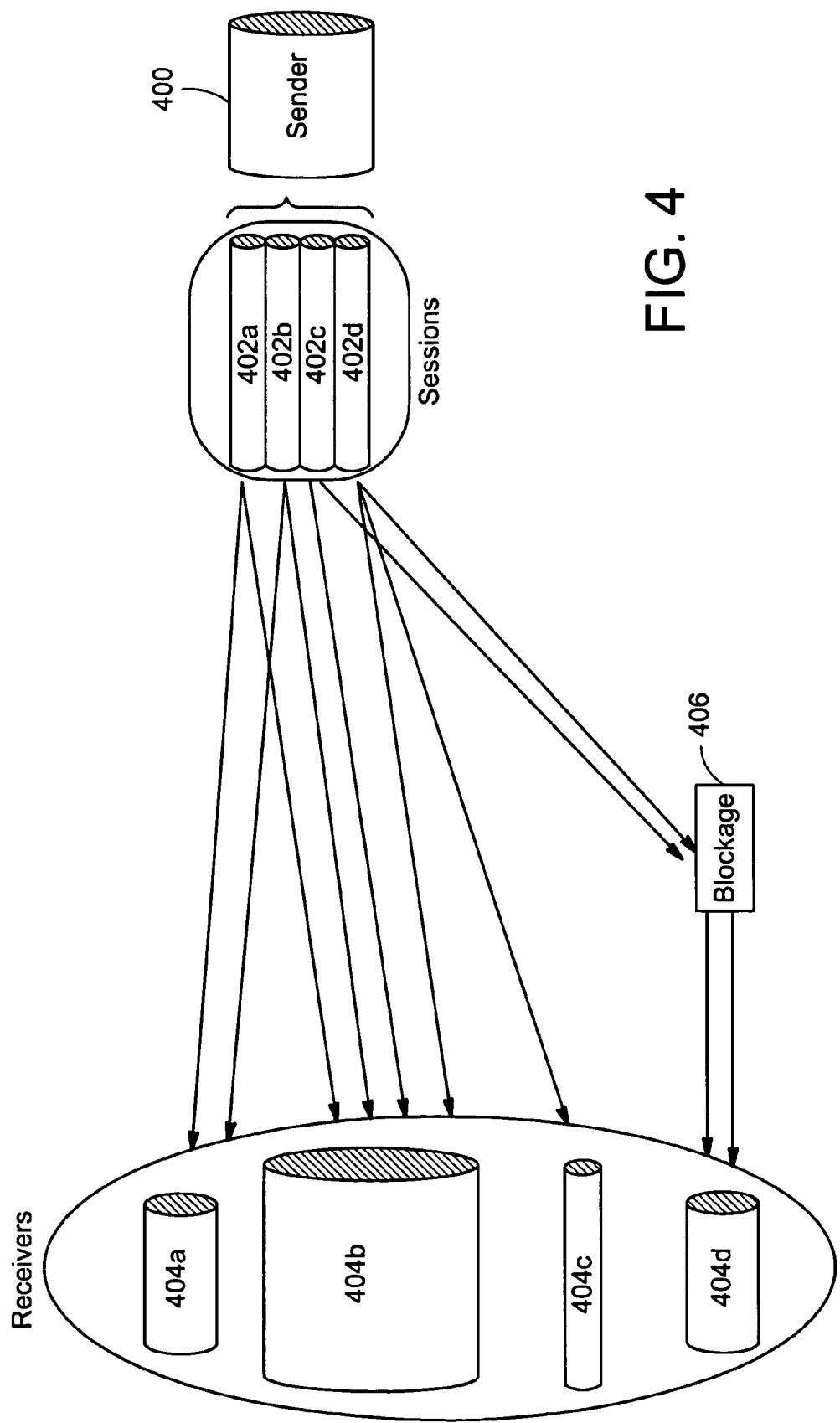
FIG. 4 is an example of layered coding according to an example embodiment of the instant invention.

FIG. 4 is an example of layered coding. In this example, sender 400 splits the data to be sent into four sessions (pipes) 402a-d of known size. Receivers 404a-d in this example are of different capacities, and they subscribe to sessions 402a-d according to their capacity. In this example, receiver 404a is capable of processing two sessions simultaneously, so it subscribes to sessions 402a-b. Receiver 404b has a comparatively large capacity in comparison to the sender and thus subscribes to all four sessions 402a-d. However, receiver 404c is "narrow" (e.g. of a lower capacity) and thus only subscribes to session 402d.

Although receiver 404d is capable of subscribing to sessions 402c-d, blockage 406 delays the transmission from these sessions 402c-d to receiver 404d. Blockage 406 may be, for example, network congestion, a long delay, etc. While blockage 406 might affect all transmissions in a conventional, certain embodiments can correct for and/or accommodate this delay. In certain example embodiments, each layer preferably exists on a separate UDP socket. Thus, each session may be treated separately. An additional corrective refinement is that each pipe may send forward error correction data along with the transmission. It will be appreciated that the amount of additional protection may depend on, for example, the width of the receiver. In certain example embodiments, then, receivers will join layers based upon receiver capability

1.3 Compression In and/or Among Layers

Figure 5:
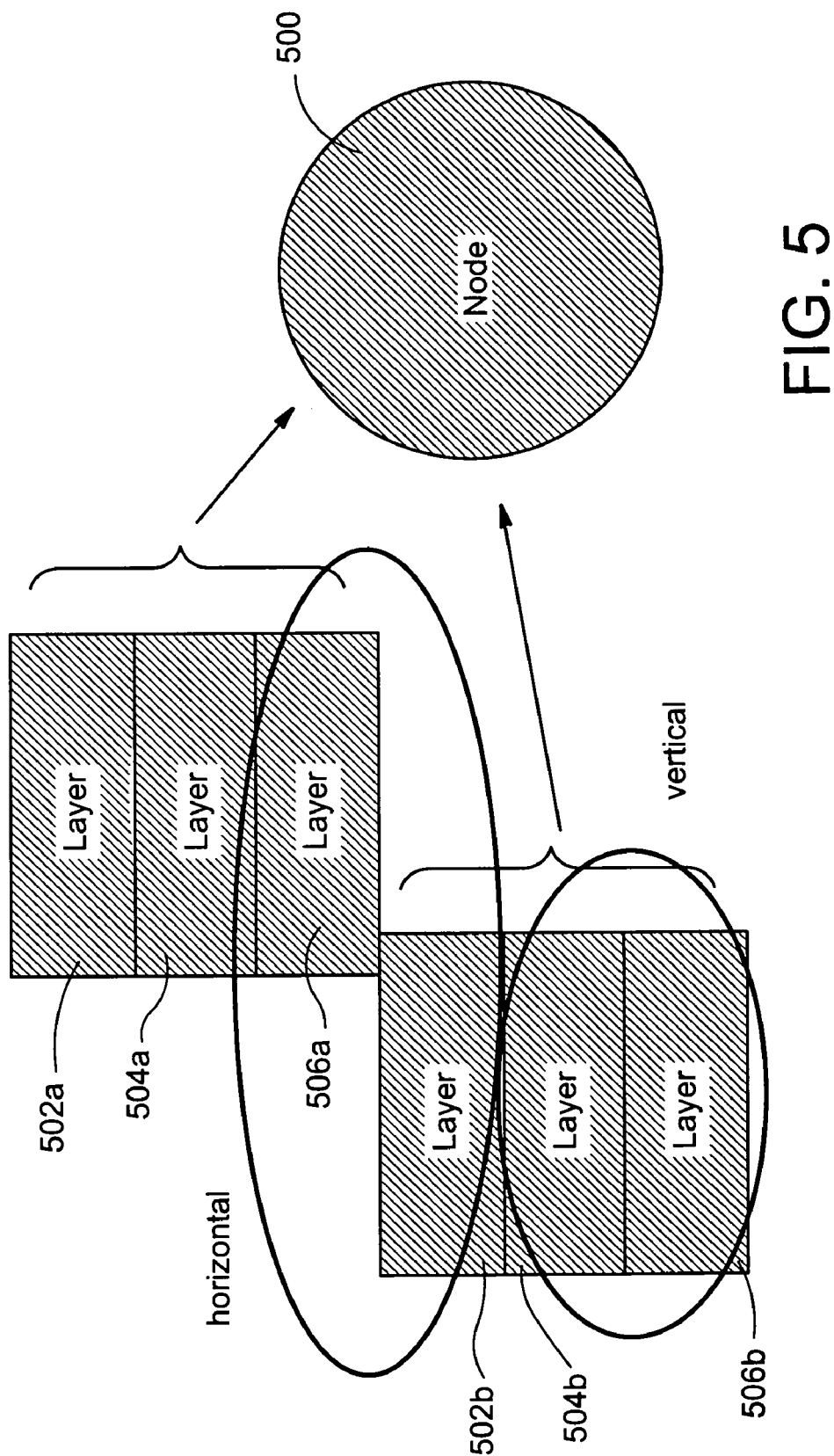
FIG. 5 is a conceptual example of how a transmission to a node may be split into horizontal and vertical layers according to an example embodiment of the instant invention; and, FIG. 6 is an flowchart describing the operation of an exemplary system in accordance with the instant invention.

When transmissions are split into layers, certain preferred example embodiments may also compress these layers. FIG. 5 is a conceptual example of how a transmission to a node may be split into horizontal and vertical layers. In FIG. 5, node 500 is about to receive two transmissions in sequence. A first transmission is comprised of layers 502a, 504a, and 506a; and a second transmission is comprised of layers 502b, 504b, and 506b. Data may be compressed, for example, vertically (e.g. within a single session) using data coding. Data may be compressed, for example, horizontally (e.g. two layers in different sessions from two or more multicast senders). Certain example embodiments may compress layers vertically, horizontally, or both vertically and horizontally. Additionally, certain example embodiments may use known compression algorithms, while other example embodiments may transmit compression data (e.g. data on how to decompress the transmission) along with the compressed transmission. The selection of algorithms may be used to increase information assurance, as described in *The Effectiveness of Estimates of Kolmogorov Complexity to Identify Semantic Types*, by Stephen F. Bush an Todd Hughes, a electronic version of which may be found at: http://www.atl.external.lmco.com/overview/papers/1172.pdf. Specifically, algorithm selection of compression techniques may be based on at least tradeoffs in time to compress and compression rates (e.g. amount of compression).

2. Example System

Figure 6:
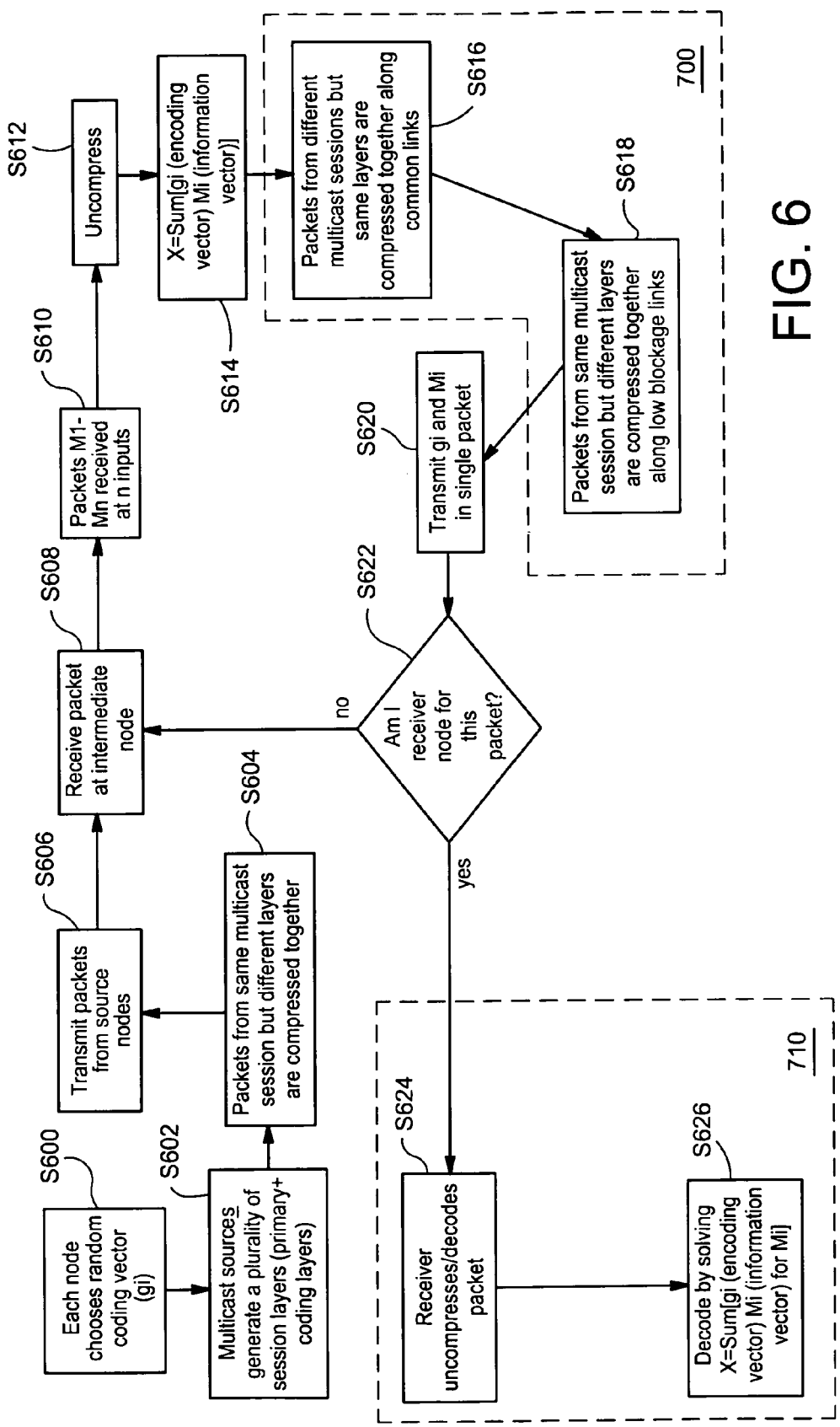

FIG. 6 is an flowchart describing the operation of an exemplary system in accordance with the instant invention. In step S600, each node chooses a random coding vector $g_i$. Then, the multicast source(s) generate a plurality of session layers in step S602. Such session layers may include, for example, primary layers (e.g. data layers), coding layers, etc. Next, in step S604, packets from the same multicast session but different layers are compressed together. It will be appreciated that any compression algorithm may be used to perform the compression. Packets are transmitted from source nodes in step S606, and intermediate nodes receive packets in step S608. Preferably, the intermediate nodes have n inputs capable of receiving packets $M_1$-$M_n$, and it will be appreciated that the number of inputs n will depend on, for example, the capacity of the intermediate nodes. Preferably, each multicast layer is on a different socket (e.g. a different UDP socket) and is network coded separately. Decompression occurs at step S612.

Coding is performed in step S614. Coding may take place according to the following formula:

$$X=\Sigma(g_i M_i)$$

where, as stated above, $g_i$ is an encoding vector and $M_i$ is an information vector. It will be appreciated that other coding formulas may be used. In box 700, packets from the same multicast session but in different layers are compressed together along low blockage links in step S618, and $g_i$ and $M_i$ are transmitted in a single packet in step S620. It will be appreciated that the compression rate will be the smallest along min-cut intervals. It will be appreciated, however, that the compression described herein as taking place in box 700 is for exemplary purposes only and relates to only one way of compressing layers. Other forms of compression may be substituted for, or used with, the compression techniques described herein. It also will be appreciated that, in general, compression rates are lower when the amount of pre-compressed data is smaller because, for example, compression rates of equal entropy data will be higher when there is more data. Accordingly, min-cut flows will, by definition, contain less data (per unit time) than cuts in general and thus have a lower compression rate.

Step S622 determines whether the intermediate node is the receiver node for this packet. If the current node is not the receiver node, the process returns to step S608, where the packet is forwarded on to the next intermediate node. If, however, the current node is the receiver node for the packet, the receiver decompresses and/or decodes the packet in step S624. In step S626, the packet is decoded by solving the encoding equation given above.

Preferably, this process achieves the min-cute rate with less overhead than rateless codes alone. Rateless FEC packets, however, may be included through network coding. While it may not be feasible to implement truly rateless FEC, approximations and/or simulations thereof may be implemented in certain example embodiments.

Certain example embodiment require all nodes to be capable of network coding. However, it will be appreciated that not all embodiments require this capability of all nodes. For example, certain example embodiments may be implemented where at least the end nodes and one network node (e.g. a satellite) are capable of network coding. Nodes in certain example embodiments multicast to a satellite, while a satellite then broadcasts data. In such example embodiments, non-network coding nodes may act as simple pass-through nodes and may be transparent to network coding elements. It will be appreciated that in such example embodiments, the coding gain may be less than if all nodes are capable of performing coding.

Additionally, the example embodiments described herein are described with respect to nodes in networks (e.g. wireless networks) with layers functioning on separate UDP ports, however the present invention is not so limited. Furthermore, while certain example embodiments assume Internet Protocol transmissions functioning with, for example, IETF protocols, the present invention is not so limited.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments.

What is claimed is:

1. A method of transmitting a message from at least one multicast sender through a network of nodes, said method comprising:
  for the at least one multicast sender:
    generating a plurality of session layers comprising a primary layer and a coding layer;
    compressing packets, from common multicast sessions but different layers, together, into information packets; and
    transmitting the information packets to another node;
  for each node in the network of nodes:
    choosing a random coding vector;
    receiving information packets from the at least one multicast sender;
    uncompressing the packets;
    encoding the packets;
    compressing the packets; and
    transmitting the coding vector and the information vector in a single packet; and
  when the current node is not the receiver, transmitting the packets to another node.

2. The method of claim 1, wherein compressing the packets comprises compressing packets from different multicast sessions but the same layers, together, along common links and/or compressing packets from the same multicast session but different layers, together, along low blockage links.

3. The method of claim 1, further comprising when the current node is the receiver, uncompressing and decoding the packets using the encoding vector and the information vector.

4. The method of claim 1, further comprising calculating a max-flow min-cut of the network,
  wherein packets are sent through the network of nodes using the max-flow min-cut of the network.

5. The method of claim 1, further comprising performing the coding from node-to-node on a hop-to-hop basis so as to provide for distributed error correction coding.

6. The method of claim 1, further comprising coding the packets of the message at each node to provide for continual coding throughout the network so as to reduce overhead.

7. A system of transmitting a message from a multicast sender to a receiver through a network of nodes, wherein in use:
  the multicast sender:
    generates a plurality of session layers comprising a primary layer and a coding layer;
    compresses packets, from common multicast sessions but different layers, together, into information packets; and
    transmits the information packets to another node;
  each node in the network of nodes is configured to:
    choose a random coding vector;
    receive information packets from the multicast senders;
    uncompress the packets;

encode the packets;

compress the packets; and transmit the coding vector and the information vector in a single packet; and when the current node is not the receiver, the current node, in use, transmits the packets to another node; and, when the current node is the receiver, the current node, in use, uncompresses and decodes the packets using the encoding vector and the information vector.

8. The system of claim 7, wherein a node in the network of nodes, in use, compresses packets, from different multicast sessions but the same layers, together, along common links and/or compresses packets from the same multicast session but different layers, together, along low blockage links.

9. The system of claim 7, wherein a max-flow min-cut of the network is determined and packets are sent through the network of nodes using the max-flow min-cut.

* * * * *